(12) United States Patent
Proctor

(10) Patent No.: US 10,827,688 B2
(45) Date of Patent: Nov. 10, 2020

(54) AERATION CONTAINER

(71) Applicant: Anthony J Proctor, Tipp City, OH (US)

(72) Inventor: Anthony J Proctor, Tipp City, OH (US)

(73) Assignee: Cristalife Company, Wheeling, IL (US)

( * ) Notice: Subject to any disclaimer, the term of this patent is extended or adjusted under 35 U.S.C. 154(b) by 307 days.

(21) Appl. No.: 16/024,250

(22) Filed: Jun. 29, 2018

(65) Prior Publication Data
US 2020/0000047 A1 Jan. 2, 2020

(51) Int. Cl.
*A01G 9/04* (2006.01)

(52) U.S. Cl.
CPC ................................ *A01G 9/047* (2013.01)

(58) Field of Classification Search
CPC ........ A01G 9/02; A01G 9/028; A01G 9/0295; A01G 9/04; A01G 9/042; A01G 9/047
See application file for complete search history.

(56) References Cited

U.S. PATENT DOCUMENTS

| | | | | |
|---|---|---|---|---|
| 2,344,202 A * | 3/1944 | Carlson | ................... | A01G 27/04 47/80 |
| 3,958,366 A | 5/1976 | Meyers | | |
| 4,100,699 A | 7/1978 | Skaife | | |
| 4,173,097 A | 11/1979 | Staby | | |
| 4,667,439 A * | 5/1987 | Maillefer | ............... | C05F 17/907 47/66.6 |
| 4,813,177 A | 3/1989 | Brilliande | | |
| 5,201,860 A | 4/1993 | Richardson | | |
| 6,266,921 B1 * | 7/2001 | Keskilohko | .......... | A01G 9/0295 47/86 |
| 10,716,054 B2 | 7/2020 | Cherian et al. | | |
| 2002/0174599 A1 * | 11/2002 | Rose | ........................ | A01G 9/02 47/65.6 |
| 2003/0024160 A1 * | 2/2003 | Hendrickson | .......... | A01G 9/024 47/67 |
| 2006/0288640 A1 * | 12/2006 | Leithold | ................. | A01G 9/028 47/39 |
| 2011/0148124 A1 * | 6/2011 | Soejima | ................. | A01G 9/022 290/1 R |
| 2013/0125459 A1 * | 5/2013 | Nelson | ................... | A01G 9/022 47/66.6 |

(Continued)

FOREIGN PATENT DOCUMENTS

| | | | | |
|---|---|---|---|---|
| EP | 1958498 A1 * | 8/2008 | ............. | A01G 9/02 |
| EP | 3369310 A4 * | 6/2019 | ............. | A01G 9/047 |
| FR | 2544958 A3 * | 11/1984 | ............... | A01G 9/02 |

Primary Examiner — Michael H Wang
(74) Attorney, Agent, or Firm — Lamon Patent Services; Cynthia S. Lamon

(57) ABSTRACT

An aeration container system for plants having aerial roots, comprising an aeration container comprising a plurality of elongate curved vanes, each vane comprising a top portion, lower portion, a first planar side and a second planar side opposing the first planar side, the planar sides connecting a front edge, outer edge and the top and bottom portions. A reservoir is also provided wherein each vane is equidistantly spaced and attached perpendicular to an outside surface of the reservoir and focus light and ambient airflow from outside the aeration container to inside the aeration container.

10 Claims, 8 Drawing Sheets

(56) References Cited

U.S. PATENT DOCUMENTS

| | | | |
|---|---|---|---|
| 2015/0342127 A1* | 12/2015 | Gallant | A01G 9/047 47/20.1 |
| 2016/0174470 A1* | 6/2016 | Shaffer | A01G 9/0291 47/66.7 |
| 2016/0242366 A1* | 8/2016 | Cute | A01G 9/021 |
| 2018/0325053 A1* | 11/2018 | Gallant | A01G 31/047 |
| 2020/0146232 A1* | 5/2020 | Hemerka | A01G 9/04 |

* cited by examiner

AERATION CONTAINER

CROSS-REFERENCE TO RELATED APPLICATIONS

There are no parent filings of the present invention.

BACKGROUND OF THE INVENTION

1. Field of the Invention

The present invention is within the field of horticulture, specifically providing various growing containers for epiphytic plants requiring specialized growing environments. Specialized growing environments may include apparatus and methods for providing growing containers enabling superior aeration of a root system, while maintaining moisture requirements.

2. Description of Related Art

The growth of plants in containers has been a practiced benefit from before recorded history. Development of containers has evolved along with creation of specialized plants requiring unique growing environments. Plants typically have root systems that grow in a medium contained within the pot, such as, soil, moss, and other natural or synthetic growing media. Some cultivated plants have aerial roots, such as holo-epiphyte type plants that spend their entire lives not growing in the ground. These specialty plants have aeration roots, which are roots that are fully or partially exposed to the air. These types of root systems have unique requirements not addressed by typical plant pots known in the industry.

Aerial roots are a type of adventitious root. They grow, not from root tissue, but from the plant's stem or leaf tissues. Because they're exposed to the air, they're more likely to dry out and are usually found in plants that live in wet environments, for example, tropical rain forests. Some aerial roots may include chlorophyll, the plant chemical that helps to convert the sun's energy into food for the plant, and can photosynthesize.

A major cultivated plant having aerial roots is the orchid. Orchids are grouped into their own plant family, Orchidaceae, because of their dissimilarities with other plants. Orchids are known to be very difficult to grow and bloom successfully. Many groups, organizations, and individuals make it their life's work to successfully grow orchids. Part of the difficulty involved with growing orchids are the specific requirements of aeration and moisture in their specialized root system.

Because epiphytic orchid roots are exposed to air and sunlight, they have chloroplasts that are capable of photosynthesis, similar to the function of their leaves. Normally white, the roots may appear green during times when they are manufacturing chlorophyll. Orchid roots that are exposed to air would dry out quickly if they were not adapted to soilless growth. Their adventitious roots are covered with a thick epidermal cell layer called velamen that mitigates water loss and protects the roots; therefore, it is important to have a growing container that provides exposure to light for these types of root systems.

Orchid roots, and eventually the entire plant, will die if they do not get air, and this is the reason that, with the exception of a few terrestrial varieties, orchids do not grow in soil. Orchid potting media should be open, with exceptionally good drainage, yet capable of holding sufficient moisture to support the plant's needs. Orchid plants are also intolerant of a stale, stagnant environment. A buoyant atmosphere and gentle air movement must be provided at the root level at all times. Good air circulation in the growing area is key, and can help plants dry quickly after watering or rains. For orchids grown in the home, this is commonly provided by an overhead paddle fan or a portable oscillating fan directed away from the plants.

More orchids are killed by incorrect watering than by any other reason. Proper watering consists of two separate components; quantity and frequency. Orchids are commonly watered just as they dry out. Humidity, air movement, potting medium (if any) and light levels all play a role. There are several ways to determine when a potted orchid is almost dry: the surface of the potting mix will appear dry; dry pots will feel lighter; clay pots feel dry; a wooden stake or skewer inserted into the potting mix will come out almost dry. Overwatered plants may suffer from diseases such as black rot and could develop mold and mildew. No part of the orchid should remain wet for any extended periods. Good air circulation in and around the growing area is key, and will help leaves and roots dry quickly after watering or rain.

For plants with aeration roots, such as orchids, where growing media are slight or non-existent, and solid plastic or other materials are used for pots that do not absorb water, it is difficult to know when to water. It is also extremely difficult to provide aeration to roots of the orchid, or other plants with an aeration root system.

What is needed is a growing container that is specifically designed to provide adequate light for photosynthesis at the root level, and focus aeration in the area of the root system while consistently maintaining a proper amount of moisture in the plant's entire ecosystem of leaves and roots.

BRIEF SUMMARY OF THE INVENTION

An aeration container system for plants having aerial roots, comprising an aeration container comprising a plurality of elongate curved vanes, each vane comprising a top portion, lower portion, a first planar side and a second planar side opposing the first planar side, the planar sides connecting a front edge, outer edge and the top and bottom portions. A reservoir is also provided as an attachment point for the vanes. In this embodiment, each vane is equidistantly spaced and attached perpendicular to an outside surface of the reservoir and focus ambient airflow from outside the aeration container to inside the aeration container.

One embodiment provides that the inside edge faces towards the reservoir and the outside edge faces away from the reservoir, the vane attaches to the reservoir via the inside edge having a first arc that matches and is adjacent to a second arc formed by the outside surface of the reservoir.

An additional embodiment may provide a root retainer enabled to hold aeration roots of a plant is positioned above the reservoir and held in place by the vanes. The root retainer in this embodiment may have a plurality of elongate aeration slots. One embodiment may include an upper circular ledge that engages a lip at the top portion of each vane enabling the vanes to hold the root retainer above the reservoir.

Additional embodiments include dimensions of airspace between the vanes attached to the reservoir in a range of between 2 mm and 10 cm. In some embodiments the reservoir may be semi-circular in shape and hold water. The reservoir may also hold obstructions including any one of pebbles, rocks, sand, or similar solid material.

In most embodiments, the bottom portion of the vanes form a horizontal edge that rests on a planar surface such as a table, windowsill or shelf. In one embodiment the vanes and reservoir may be manufactured from a translucent material enabling more light to reach the root system.

DETAILED DESCRIPTION OF THE INVENTION

Orchids are the most prominent type of plant having aerial roots, although the present invention is directed to all plants with roots requiring exposure to air, orchids being provided as merely an example.

Figure 1A:
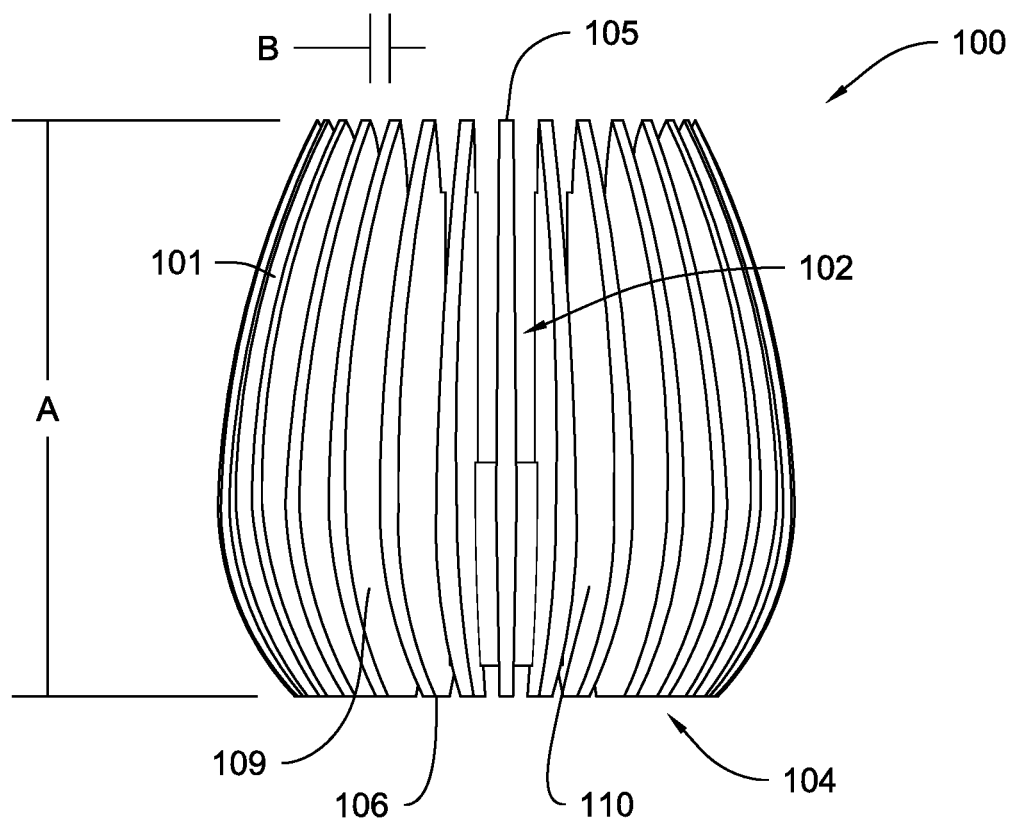
FIG. 1A is a side elevation view of an aeration container in a preferred embodiment of the present invention.

FIG. 1A shows an outside surface portion of aeration container 100 according to one embodiment of the invention. In this view, dimension A provides a height of the container, and dimension B identifies airspace 101 between vanes 101. Vanes 101 include a top 105, bottom 106, inward edge 107, outward edge 108 and two planar surface sides 109 and 110 connecting the top, bottom and both edges. Outward edge 111 represents how the width of outer edge 108 may change along the aeration container due to the spherical nature of the design. The vanes 101 may be spaced in an equidistant manner from each other and each vane may have a wider width in a lower portion than at a top portion of the vanes. Airspace dimension B may vary depending upon specific requirements of a plant held within the container, typically ranges between 2 mm and 10 cm. Vanes 101 may be manufactured from any type sturdy material and may include translucence enabling light penetration, such as, but not limited to a clear, frosted, opaque glass, lead crystal, polymer including various plastics and acrylic. Another embodiment may include solid colored material that is not translucent. Natural materials such as wood, granite, crystal, etc. may also be used in the manufacture of vanes in another embodiment. A variety of manufactured materials including steel, aluminum and ceramic could also be used. Due to the ongoing advancement of 3D materials and manufacturing, the selection of material will continue to be expansive. Choice of material may at least partially depend on specific light requirements of the plant to be supported in the container. Some plant species may require more or less light for optimum growth.

Figure 1B:
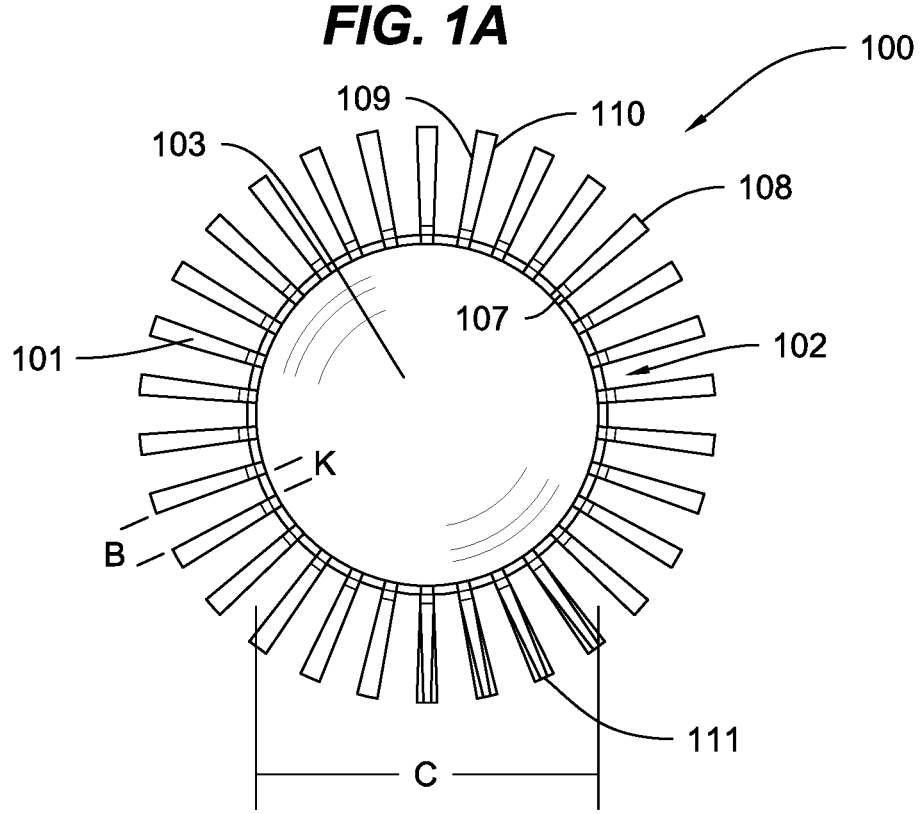
FIG. 1B is a bottom view of the container of FIG. 1A.

FIG. 1B is a bottom view of container 100 depicting a hemispherical bottom reservoir 103 of container 100 having dimension C. Reservoir 103 may be manufactured from any of the materials expressed above, in relation to vanes 101. Materials will be common between vanes 101 and reservoir 103 when integral manufacturing occurs via injection molding or 3D printing, for example.

As seen in this view, vanes 101 extend away from the reservoir 103, which may create a larger dimension B between the vanes at an outside edge formed by the vanes, than a dimension between the vanes 101 where they attach to the reservoir 103. Airspace between the vanes is clearly greater as the vanes extend outward serving to focus any airflow captured at airspace 102 towards the reservoir and an interior of the container 100.

Figure 2A:
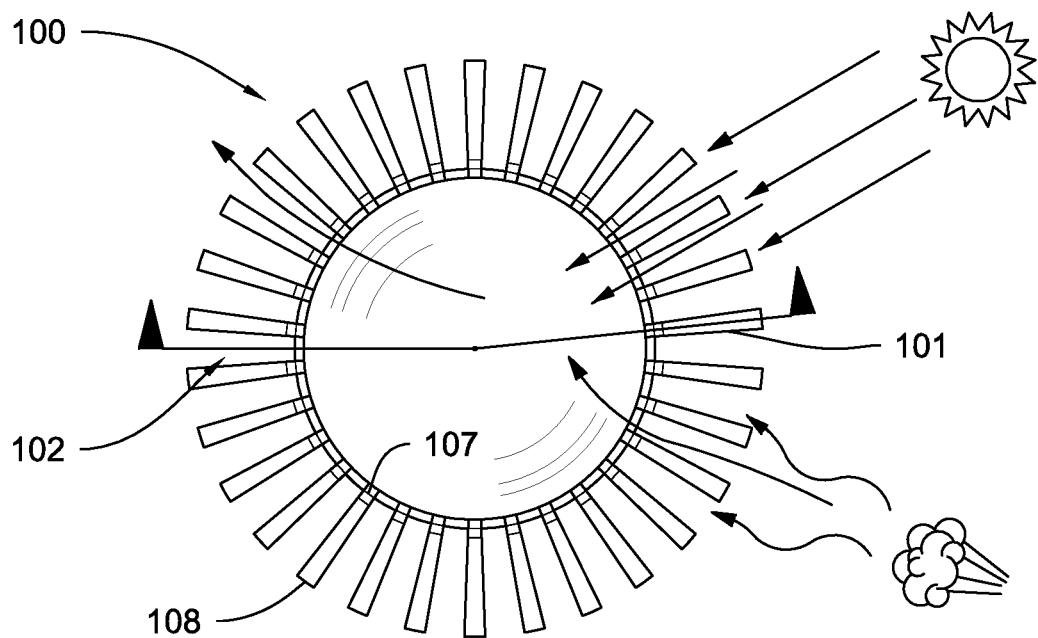
FIG. 2A is a view from the top showing directed lighting and air flow.

FIG. 2A depicts an aerial top view looking into the reservoir 301. In this view, straight arrows and wavy arrows may show light and/or airflow penetrating the container, and flowing through the container. Since the design of the aeration container has vanes that are spaced apart via airspace 102, indoor ambient light will naturally illuminate in and around said container. Additionally, the inventor of the present invention realizes that not only airflow, but light waves may also penetrate the interior of container 100 via the airspace 102. A hatch mark is shown defining a cross section view shown in FIG. 2B.

Figure 2B:
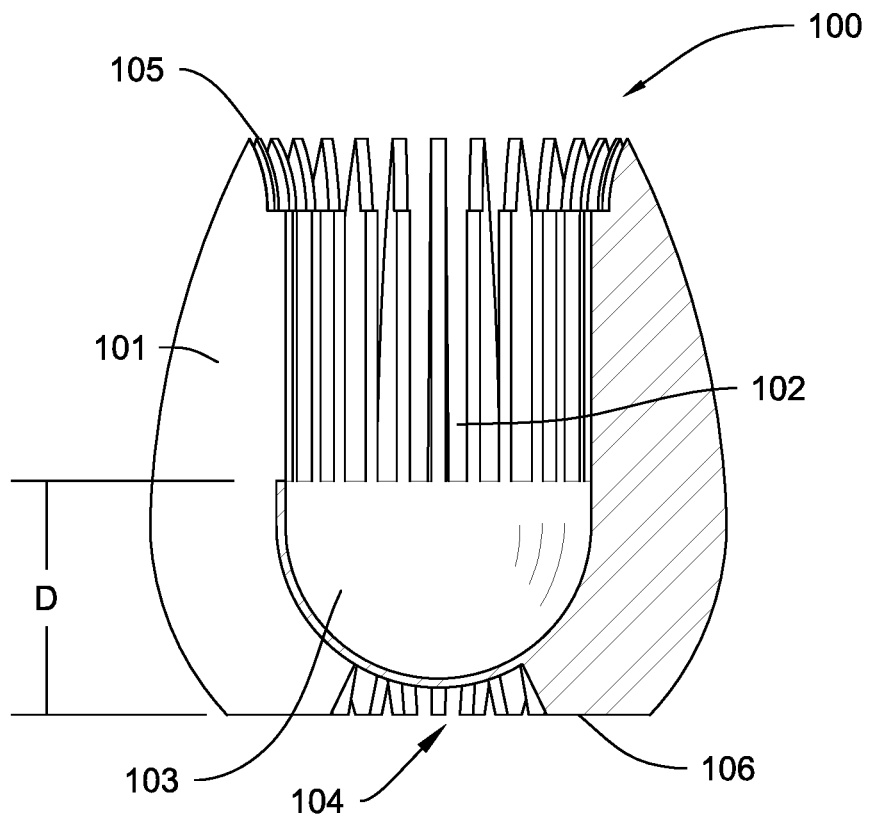
FIG. 2B is a cross-section view of the container in another embodiment.

FIG. 2B is a cross section view defined by the hatch mark shown in FIG. 2A. This view shows vanes 101 and their orientation to reservoir 103. An inside lower portion of vanes 101 may adhere to the reservoir 103 via spot soldering, soldering, glue, injection molding, or 3D printed. In one embodiment, an inside portion of the vanes facing the reservoir 103 may be retrofitted with protrusions that removably attach or "snap on" to an upper and lower lip or ridge on an outside surface of the reservoir 103. In this manner different configurations of vanes may be mixed and matched to create unique containers having vanes of differing materials, colors, and spacing between each other.

In one embodiment shown, the reservoir rests upon and is adjacent to an inside curve or arc of bottom portions of all of the vanes indicated by dimension D. In this embodiment, a bottom plane 105 is formed by lower straight horizontal edges 104 of each of the bottom portions of the vanes 101. This bottom plane provides a flat and horizontal plane enabling the container to rest on a planar surface such as a table or shelf. In another embodiment a bottom surface of reservoir 103 may directly rest on a table or shelf.

An alternative embodiment includes a reservoir that is not semi-circular, but is available in various shapes. Specifically, the reservoir may be manufactured in an oval shape, wherein vanes 101 extend from the oval instead of a semi-circular shape as shown in FIG. 2B. Additionally, the vanes 101 may have various cutouts adding an ornamental quality to an outside edge of each vane. In another embodiment an apex is formed along the entire outer edge of each vane in order to reduce resistance of ambient air flow into the vase 100.

Figure 3A:
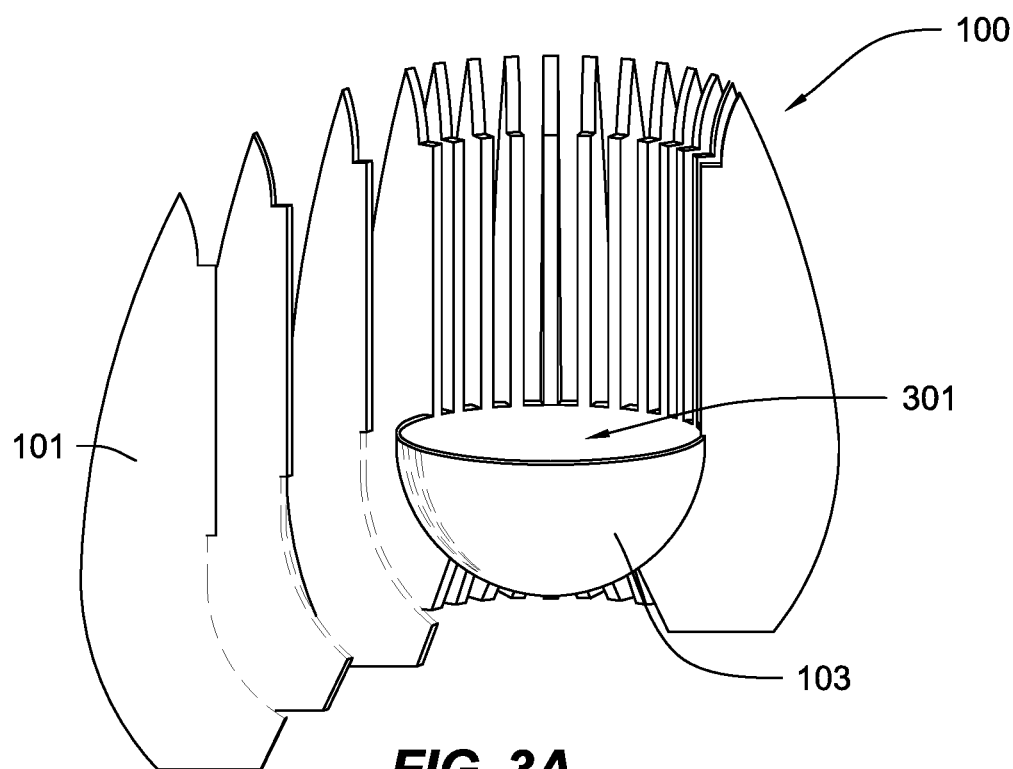
FIG. 3A depicts assembly and fin configuration of one embodiment of the container.

FIG. 3A shows container 100 in another embodiment of the present invention with individual vanes 101 detached from the hemispherical bottom reservoir 103 showing an interior of the reservoir 301.

Figure 3B:
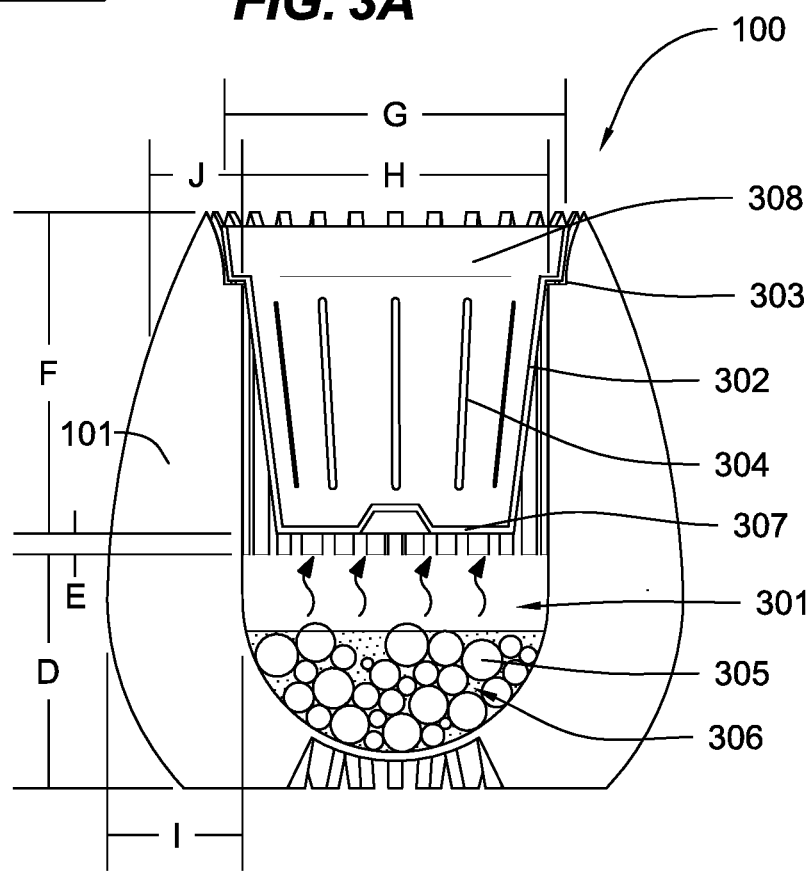
FIG. 3B shows an interior portion of the container in another embodiment.

FIG. 3B shows more detail of an interior arrangement of container 100. In this embodiment obstacles 305 such as sand, pebbles, water retaining material, clay particles or rocks are placed within interior reservoir 301 in order to displace water and/or water with fertilizing chemicals also held within. Water evaporation and fertilization rate is thereby regulated in this manner.

Figure 6:
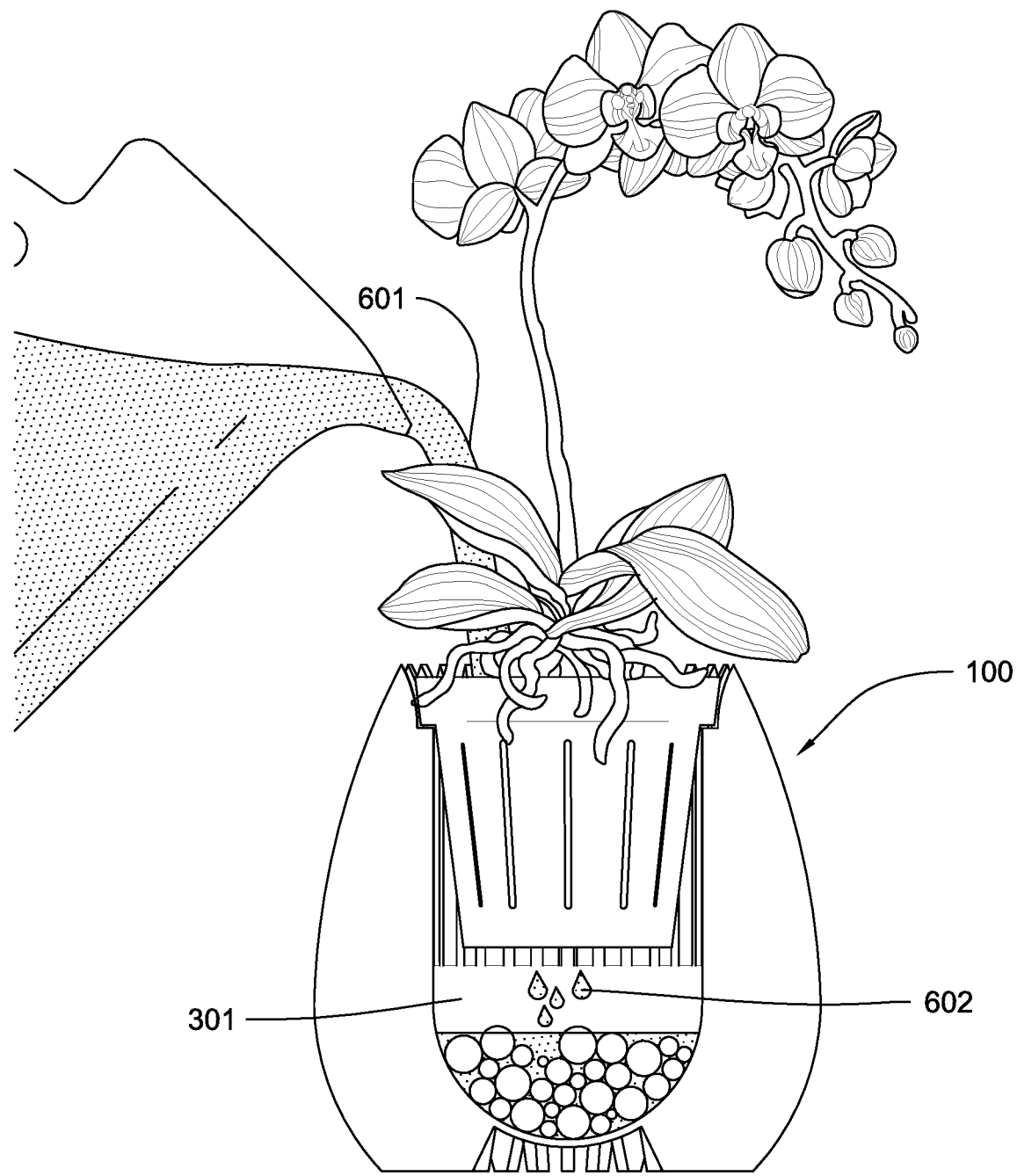
FIG. 6 depicts water flow during watering of a plant in the root restraint and container in one embodiment.

In the embodiment of FIG. 3B, dimensions are shown to specifically call out relationships between dimensions of vanes 101. Dimension J is shown at the top of the vanes, and dimension I is at a widest portion of a lower portion of the vanes. As can be seen by one with skill in the art, the top portion F includes a dimension J, which is a lesser dimension than I, at lower portion D. In some embodiments dimension J is approximately or exactly, two-thirds the dimension of E. The width variation in the vanes serves to direct more airflow towards the roots, which are positioned above the reservoir as seen in FIG. 6.

A root retainer 302 is provided to assist in containing and anchoring specialty roots of epiphytic plants like orchids. Roots contained in retainer 302 may extend and fill an interior space of root retainer 302. Dimension F is the height of the root retainer 302. Root retainer 302 may be manufactured from clear, translucent or opaque material enabling light to enter the container and bathe roots of a plant retained therein. This is beneficial as many aeration roots have chlorophyll and need light in order to photosynthesize. The root retainer may or may not be implemented in the present invention. Root retainer includes bottom holes 307 (not specifically shown) to accept water evaporation vapor from water 306 evaporating from reservoir interior 301. Interior reservoir 301 may contain pebbles, marbles or rocks, 305 to reduce an amount of water standing in 301 and to regulate evaporation.

Dimension G is the diameter of a top ledge 308 of the retainer 302 that rests upon each retainer support lip 303 of each vane 101. In this manner the root retainer may be held and secured within container and above the reservoir 103. Dimension H depicts an inner diameter of retainer 302 that does not include the ledge portion of dimension G. As can be seen in this embodiment retainer air slots 304 extend the length of the retainer 302 enabling airflow to any roots retained within. Airflow may also enter the retainer 302 via holes 307. The ledge 308 and retainer support lip 303 serve to hold and secure root retainer 302 above a waterline formed by water 306 enabling roots held within container 100 to never touch the water. This is important as many select types of mold and mildew can negatively affect aeration roots that are allowed to constantly touch or are partially immersed in water.

Figure 4A:
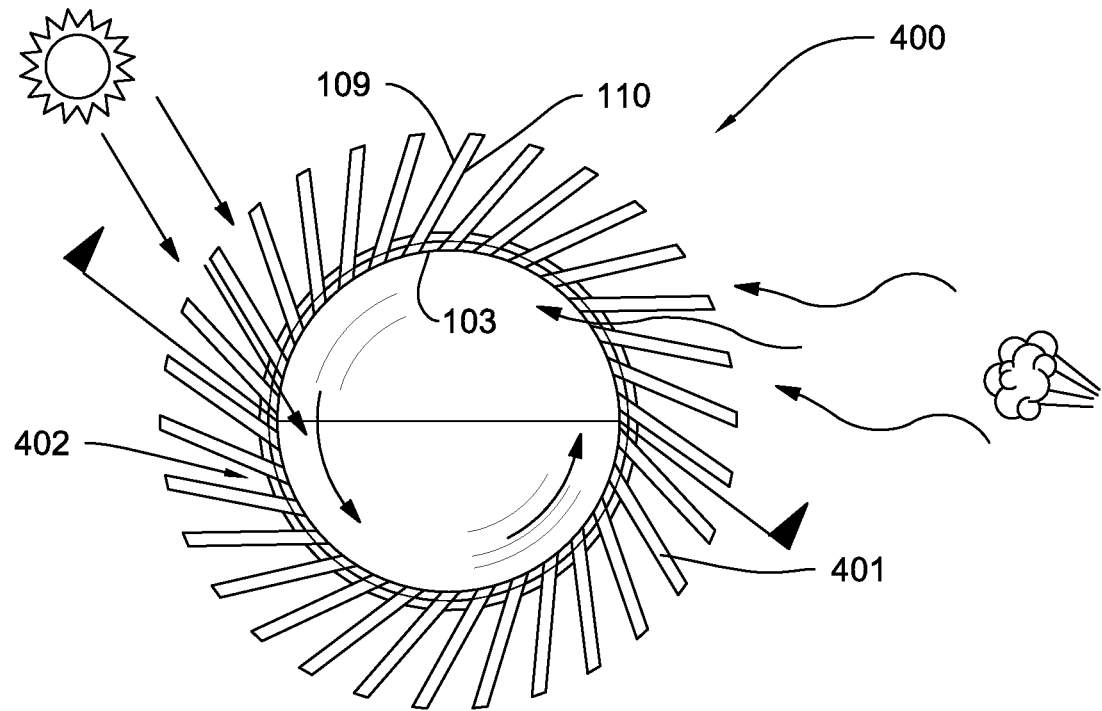
FIG. 4A is a top aerial view depicting angled fins in another embodiment of the container.

FIG. 4A shows an embodiment wherein the vanes are attached or otherwise integrated at an angle between a plane formed by a planar side 110 of the vane 401 to an outer surface of the reservoir 302 of less than 90 degrees. The angle of attachment may range from 45-80 degrees where planar side 110 meets the reservoir 302. Additionally, the adjacent planar side 109 forms an obtuse angle to the outside surface of reservoir 103. The vane may be angled as depicted in planar sides 109 and 110, or these vanes may be slightly curved with an arc. This arc may be practically unnoticeable or clearly evident. With innovative angle vane attachment, airflow may be captured and directed in various ways. For example, as shown with straight arrows, airflow hitting the angled vane is captured and directed to the reservoir 302.

Vanes as depicted in either FIG. 2A or 4A, include a shape forming an airfoil with a camber, front curve of the vane, including a top or front portion commonly being more convex or having a positive camber. One with skill in sailing art understands this shape may serve to focus or direct airflow to a lower inner area of the container, specifically at a root portion of a plant that may be above the reservoir 103.

Figure 4B:
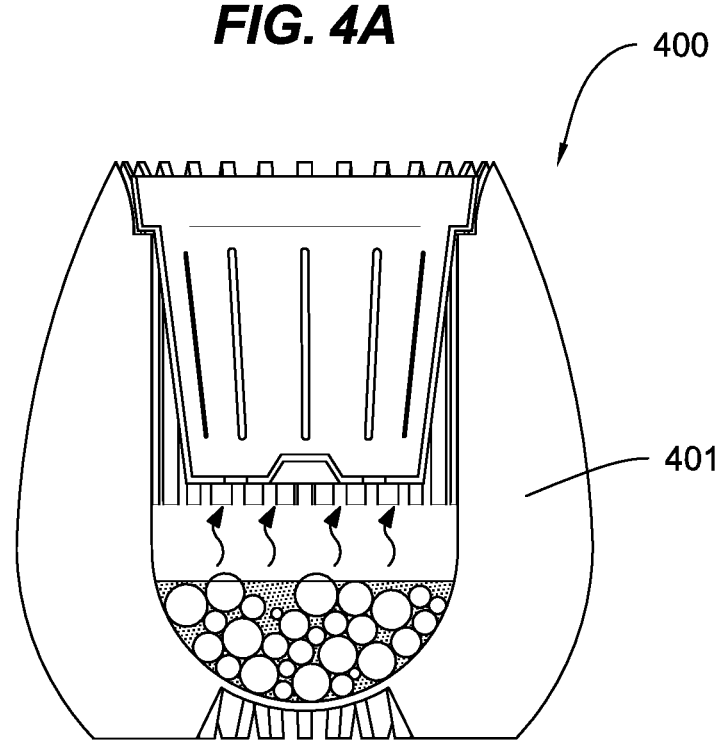
FIG. 4B depicts a root restraint and water retention orientation of the container in another embodiment.

FIG. 4B is another embodiment showing an integral formation of vanes 401 to the reservoir while holding the root retainer via the ledges. In this embodiment, one with skill may visualize a system wherein airflow is accepted and focused to a root retainer and roots within the container 400 while simultaneously allowing moisture (wavy arrows) to migrate from the reservoir interior 301 to root retainer 302. In another embodiment an LED light or other form of lighting may be integrated in the container at or below the reservoir 103, projecting up from or through the reservoir which provides an illuminating effect throughout the container when translucent material is used in manufacture of the container.

Figure 5:
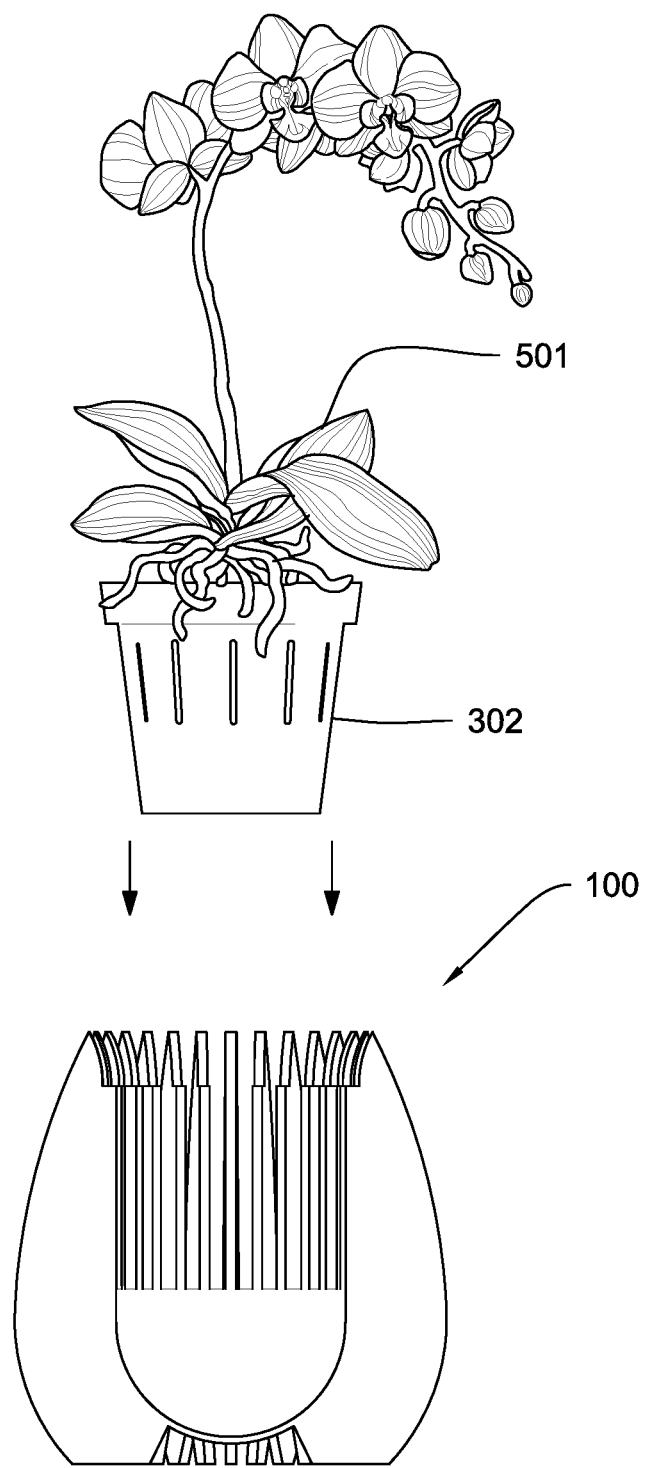
FIG. 5 shows an orientation of the root restraint being inserted into the container in an embodiment.

FIG. 5 shows the orientation (via directional arrows) and placement of a plant 501 within root retainer 302 being placed within container 100. In this manner, water and pebbles in the reservoir may be replaced or otherwise cleaned while plant 502 is easily removed and replaced within container 100.

Figure 7:
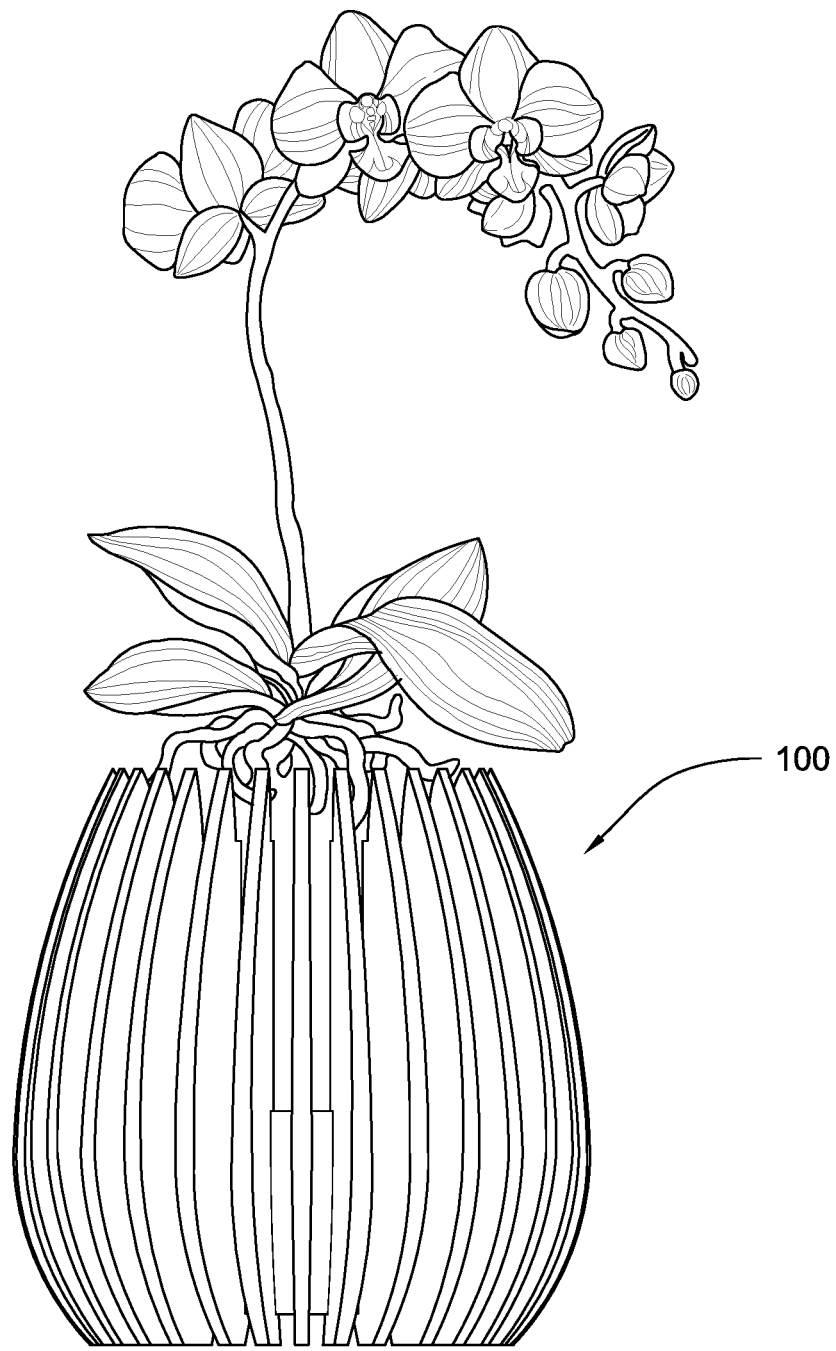
FIG. 7 shows an elevation side view of the aeration container with a plant inserted and growing within the container.

FIG. 6 shows an interior cross section of container 100, where the vanes are removed on one side to show the interior root retainer. The reservoir outer surface is removed to display the water and stones, pebbles, etc. which may be held within to displace water. In this embodiment it is understood that the roots of the orchid extend into an inner volume of the root retainer. Poured water 601 is added from outside the container and may be poured while the root retainer is held within container 100. Since interior walls of the aeration container are parallel, and the root retainer is angled inward, it is unlikely for water to spill outside of the aeration container. The water traverses through the plant and roots with drops 602 flowing to the reservoir interior 301. The presence of water into the reservoir container, which provides humidity in the reservoir, can create an exceptional continuous ecosystem for plants with aeration roots. FIG. 7 shows an assembled container with plant roots and retainer in container 100.

Figure 8A:
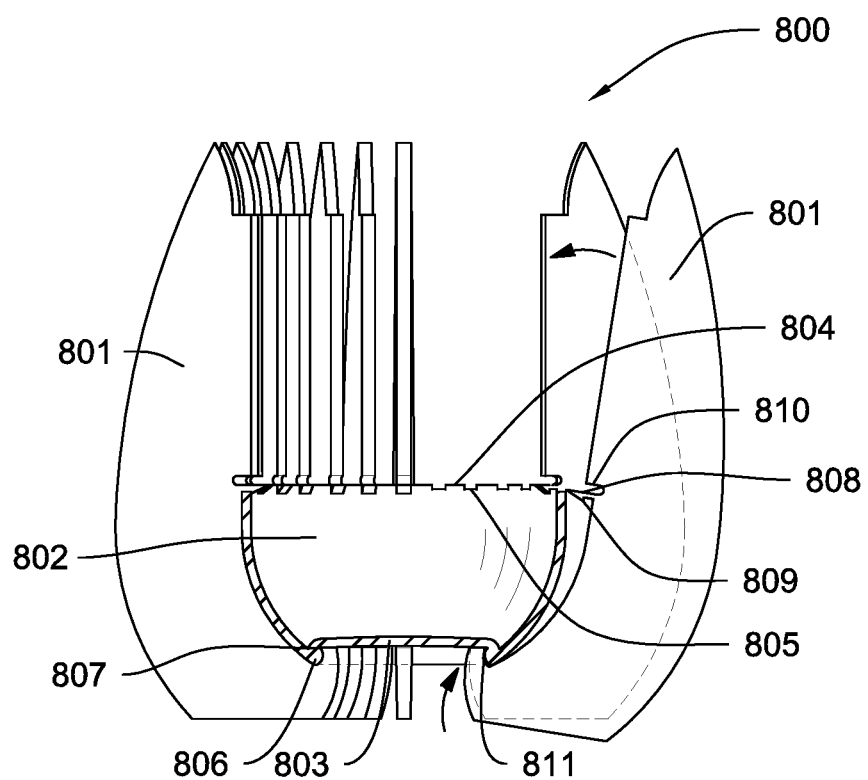
FIG. 8A depicts assembly with a configuration with each individual vane locking into the interior portion of the container in another embodiment.
Figure 8B:
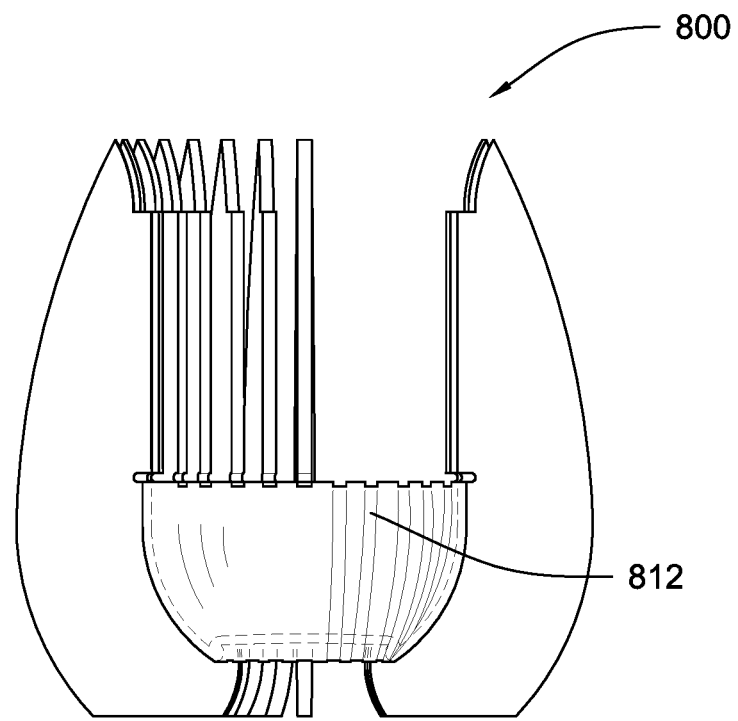
FIG. 8B shows an interior portion of the container with slots to secure each fin in another embodiment.

FIGS. 8A and 8B depict another embodiment allowing a snap on vane to a base reservoir. There are many advantages to this system providing more flexibility when assembling or manufacturing a vase. In this embodiment vanes may be snapped on permanently in manufacturing instead on molding or 3D printing, for example. In another embodiment, one may mix and match colors and styles of vanes, providing more or less vanes per vase. A kit may be provided to allow an end user to create their own vase(s) selecting their own vanes to snap on from a variety of choices.

FIG. 8A shows a multi-part vase assembly 800 having individual vanes 801. Each vane 801 may include a vane top tab 808 and vane base tab 811. A reservoir 802 is provided as a base for snapping on the vanes as well as functioning as presented above for reservoir 301. Reservoir 802 may include a concave reservoir bottom 803 including a reservoir base shoulder or ledge 806 extending around a perimeter of the reservoir bottom 803. One embodiment provides a semi-circular reservoir 802 although the shape of the reservoir is not limited to semi-circular, but may be a variety of shapes as long as the vanes are shaped accordingly for secure attachment. For example an oval shape may be provided, square, rectangle or other shape.

In this embodiment the ledge 806 serves to anchor vane base tab 811 wherein the tab hooks around the ledge thereby anchoring the base tab within the concave reservoir bottom 803. Reservoir 802 may also include a reservoir top edge 804 including a plurality of notches 805 serving to accept a tooth 809 at a proximal end of top tab 808. A relief slot 810 may also be formed in vane 801 just above the top tab 808. In one embodiment a leading edge facing the reservoir, when attached, may fit into an anchor slot 807. In one embodiment a separate anchor slot may be directly aligned under each notch 805 providing a much more secure attachment site for vanes 801. FIG. 8B shows the reservoir 802 with a plurality of slots 812 aligned under each notch for accepting each vane.

The embodiments described above are exemplary only and do not describe every possible aspect and application of the invention, as many of the mechanisms may be implemented in a variety of ways. The scope of the invention is limited only by the claims that follow.

The invention claimed is:

1. An aeration container system for plants having aerial roots, comprising;
   an aeration container comprising a plurality of elongate curved vanes, each vane comprising a top portion, lower portion, a first planar side and a second planar side opposing the first planar side, the planar sides connecting a front edge, outer edge and the top and bottom portions; and
   a reservoir;
   wherein each vane is equidistantly spaced and attached perpendicular to an outside surface of the reservoir and focus ambient airflow from outside the aeration container to inside the aeration container.

2. The aeration container of claim 1, wherein the inside edge faces towards the reservoir and the outside edge faces away from the reservoir, the vane attaches to the reservoir via the inside edge having a first arc that matches and is adjacent to a second arc formed by the outside surface of the reservoir.

3. The aeration container of claim 2, wherein a root retainer enabled to hold aeration roots of a plant is positioned above the reservoir and held in place by the vanes.

4. The aeration container of claim 3, wherein the root retainer includes a plurality of aeration slots.

5. The aeration container of claim 3, wherein the root retainer includes an upper circular ledge that engages a lip at the top portion of each vane enabling the vanes to hold the root retainer above the reservoir.

6. The aeration container of claim 1, wherein the plurality of vanes surrounds the reservoir having an airspace between the equidistantly spaced vanes between 2 mm and 10 cm.

7. The aeration container of claim 1, wherein the reservoir is semi-circular in shape and holds water.

8. The aeration container of claim 7, wherein the water contains obstructions including any one of pebbles, rocks, sand, or similar solid material.

9. The aeration container of claim 1, wherein the bottom portion of the vanes form a horizontal edge that rests on a planar surface such as a table, windowsill or shelf.

10. The aeration container of claim 1, wherein the vanes and reservoir are manufactured from a translucent material.

* * * * *